(12) United States Patent
Weisberg

(10) Patent No.: US 9,375,894 B2
(45) Date of Patent: Jun. 28, 2016

(54) CONTINUOUS FILAMENT COMPOSITE PARTS AND ARTICLES OF MANUFACTURE THEREOF

(71) Applicant: Lawrence Livermore National Security, LLC, Livermore, CA (US)

(72) Inventor: Andrew H. Weisberg, San Francisco, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 44 days.

(21) Appl. No.: 14/014,190

(22) Filed: Aug. 29, 2013

(65) Prior Publication Data

US 2014/0004297 A1    Jan. 2, 2014

Related U.S. Application Data

(62) Division of application No. 12/610,050, filed on Oct. 30, 2009, now Pat. No. 8,545,657.

(51) Int. Cl.
*B32B 5/12* (2006.01)
*B32B 3/02* (2006.01)
*B29C 70/32* (2006.01)
*B32B 3/26* (2006.01)

(52) U.S. Cl.
CPC . *B32B 5/12* (2013.01); *B29C 70/32* (2013.01); *B32B 3/263* (2013.01); *Y10T 428/24074* (2015.01); *Y10T 428/24132* (2015.01); *Y10T 428/24488* (2015.01); *Y10T 428/249922* (2015.04); *Y10T 428/249924* (2015.04)

(58) Field of Classification Search
CPC ..... B29C 70/30–70/388; B29C 53/56–53/785; B32B 5/12; B32B 5/02

USPC .......................................... 428/292.1, 98–220
See application file for complete search history.

(56) References Cited

U.S. PATENT DOCUMENTS

| | | | | |
|---|---|---|---|---|
| 3,976,528 A | * | 8/1976 | James | 156/244.23 |
| 4,192,905 A | * | 3/1980 | Scheibal | 428/80 |
| 4,395,514 A | * | 7/1983 | Edelman | 524/600 |
| 4,661,559 A | * | 4/1987 | Gardner et al. | 525/65 |
| 4,943,472 A | * | 7/1990 | Dyksterhouse et al. | 442/417 |
| 5,268,223 A | * | 12/1993 | Qureshi et al. | 442/391 |

(Continued)

FOREIGN PATENT DOCUMENTS

WO    WO2006107197    10/2006

OTHER PUBLICATIONS

Pacific Brick Paving, Paver Laying Patterns, http://www.pacificbrickpaving.com.au/paving-with-pavers-information/paver-laying-patterns, accessed Oct. 23, 2013.*
Heth, J, From art to science a prepreg overview, High Performance Composites Jun. 2000.*
Toray, Carbon Fibers and Composites Terminology, www.toraycfa.com/terminology.html, accessed Oct. 23, 2013.*

(Continued)

*Primary Examiner* — Jennifer Chriss
*Assistant Examiner* — Frank Vineis
(74) *Attorney, Agent, or Firm* — Zilka Kotab

(57) ABSTRACT

An article of manufacture according to one embodiment includes a plurality of plies in a stacked configuration, where each ply includes a plurality of tape winds having edges. A distance between the edges of adjacent tape winds in the same ply is about constant along a length of the wind. Each tape wind comprises elongated fibers and a matrix, axes of the fibers being oriented about parallel to a longitudinal axis of the tape wind. Additional systems, methods and articles of manufacture are also presented.

18 Claims, 5 Drawing Sheets

(56) References Cited

U.S. PATENT DOCUMENTS

| | | |
|---|---|---|
| 6,379,799 B1* | 4/2002 | Almen .................... 428/413 |
| 8,545,657 B2 | 10/2013 | Weisberg |
| 2002/0157785 A1* | 10/2002 | Anderson et al. .......... 156/304.3 |
| 2005/0039843 A1* | 2/2005 | Johnson et al. ............... 156/175 |
| 2006/0048881 A1* | 3/2006 | Evans et al. .................. 156/64 |
| 2006/0093802 A1* | 5/2006 | Tsai et al. .................... 428/216 |
| 2007/0187024 A1* | 8/2007 | Johnson et al. ............... 156/250 |
| 2008/0083505 A1* | 4/2008 | Cope et al. .................. 156/498 |
| 2008/0274330 A1* | 11/2008 | Kranz et al. ................. 428/110 |
| 2011/0104471 A1 | 5/2011 | Weisberg |

OTHER PUBLICATIONS

DOD, Composites Materials Handbook vol. 3, Jun. 17, 2002.*
Lee, S., Reference Book for Composites Technology, vol. 1, CRC Press, Mar. 30, 1989, p. 42.*
Restriction/Election Requirement from U.S. Appl. No. 12/610,050 dated Jul. 18, 2012.
Non-Final Office Action from U.S. Appl. No. 12/610,050 dated Dec. 10, 2012.
Notice of Allowance and Fee(s) Due from U.S. Appl. No. 12/610,050 dated Jun. 6, 2013.

* cited by examiner

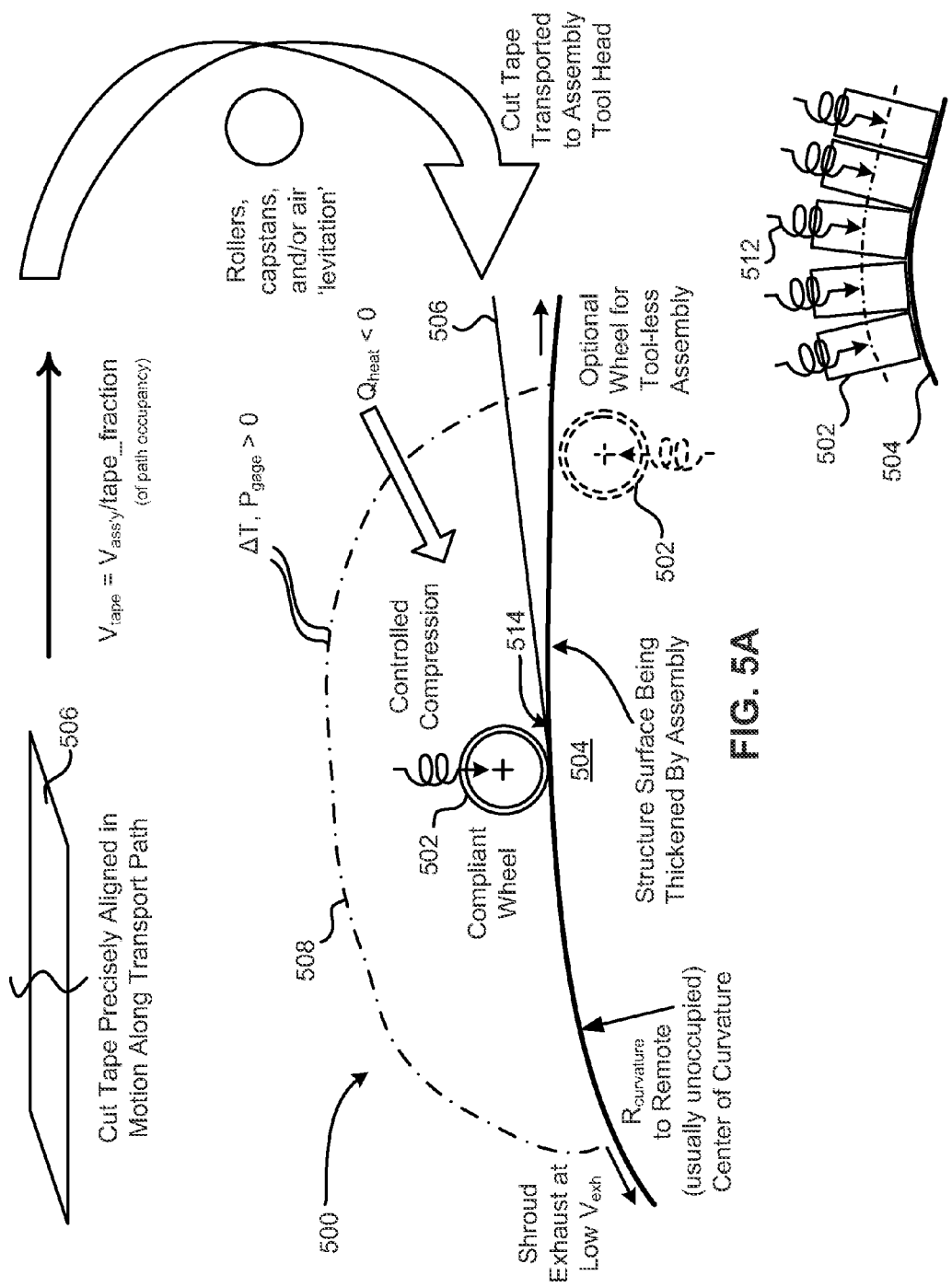

CONTINUOUS FILAMENT COMPOSITE PARTS AND ARTICLES OF MANUFACTURE THEREOF

RELATED APPLICATIONS

This application is a divisional of U.S. application Ser. No. 12/610,050 filed on Oct. 30, 2009, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to high strength structures manufactured by lamination, and more particularly to composite structures and methods of making the same using a tape comprising a fiber and a matrix.

BACKGROUND

In most lamination processes of high strength structures, a sub-process winds or places a 'tow' of matrix-infused, properly-oriented, continuous fiber composite onto the surface of the component being fabricated. Solid or flexible tapes made of such materials as metal or plastic foil may be wound onto the surface of the component being built up.

In the 1970's, considerable development of "thermoplastic matrix" composite manufacturing processes built up uniaxial, continuous fiber tapes. Those techniques failed to be adopted because the entire core of the tape required re-liquifaction during bonding, thereby producing parts whose shape was inherently unstable (prone to creep) under subsequent thermal cycling.

Conventionally used processes perform a thermosetting cure of the entire structure after it is wound, laid-up, vacuum infused, extruded, pultruded, or fiber-placed. For brevity, the collection of conventionally used sub-processes that form layers in conventional composite manufacturing processes will be called 'wet' assembly.

Conventionally used processes cure the entire part after a wet assembly sub-process in order to form a strong interface between 'plies' (or layers) of oriented continuous fiber. Such optimized interfaces are made as nearly uniform (in material properties discontinuities) as possible. Conventionally used processes rely on controlled orientation of continuous fiber to produce parts with superior strength compared to parts achievable with chopped, segmented, and/or randomly-oriented fiber. Although manufacturing costs can be substantially decreased by using fiber that is cut sometime before it is added to the final part, the lack of control of fiber cuts' locations sacrifices most of the extreme stress capacity of continuous, orientation controlled fiber.

Therefore, it would be advantageous to have techniques capable of producing composite structures which are not susceptible to creep, have low manufacturing costs and/or minimal capital costs for tooling, and/or eliminate the cost of oven curing the entire structure.

SUMMARY

An article of manufacture according to one embodiment includes a plurality of plies in a stacked configuration, where each ply includes a plurality of tape winds having edges, A distance between the edges of adjacent tape winds in the same ply is about constant along a length of the wind. Each tape wind comprises elongated fibers and a matrix, axes of the fibers being oriented about parallel to a longitudinal axis of the tape wind.

BRIEF DESCRIPTION OF THE DRAWINGS

FIG. 5A is a representative view of some assembly sub-process equipment near the line of contact according to one embodiment.

FIG. 5B shows a front view of a portion of a tool head according to one embodiment.

DETAILED DESCRIPTION

Figure 1A:
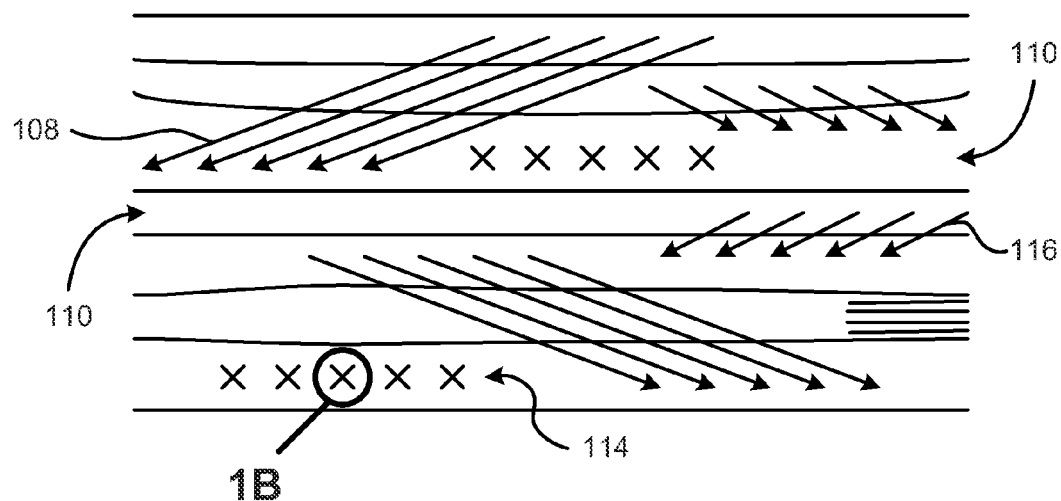
FIG. 1A shows a partial cross section of several layers of a portion of a composite structure according to one embodiment.

The following description is made for the purpose of illustrating the general principles of the present invention and is not meant to limit the inventive concepts claimed herein, Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method for forming a composite structure comprises forming a first ply; and forming a second ply above the first ply, wherein forming each ply comprises applying a bonding material to a tape, the tape comprising a fiber and a matrix, wherein the bonding material has a curing time of less than about 1 second; adding the tape to a substrate for forming adjacent tape winds having about a constant distance therebetween.

In another general embodiment, a method for forming a composite structure comprises forming a first ply; and forming a second ply above the first ply, wherein forming each ply comprises applying a bonding material to a tape, the tape comprising a fiber and a matrix, wherein the bonding material has a curing time of less than about 1 second; adding the tape to a substrate for forming adjacent tape winds having about a constant distance therebetween, wherein the tape is applied to the substrate at a rate of greater than about 10 meters/second, with the proviso that no curing step is performed after applying the tape to the substrate.

In another general embodiment, an article of manufacture comprises a plurality of plies in a stacked configuration, wherein each ply comprises a plurality of tape winds having edges, wherein a distance between the edges of adjacent tape winds in the same ply is about constant along a length of the wind, wherein each tape wind comprises elongate fibers and a matrix, axes of the fibers being oriented about parallel to a longitudinal axis of the tape wind.

In some embodiments, this invention employs a different matrix material between layers of tape than conventional methods to achieve substantial manufacturing cost advantages without sacrificing significant strength performance. Further, the methods disclosed herein allow the tape and the bonding to produce composite structures that may be superior to structures producible by conventionally used composite fabrication processes. Specifically, some embodiments are capable of extremely low manufacturing costs, minimal capital costs for tooling in sizes as big as the finished structure, and eliminating the cost of oven curing the entire structure.

Precise orientation of continuous fibers at every point in a high strength composite structure ensures that the structure has greater strength than structures which rely on less precisely placed fibers. In some embodiments, composite structures may be produced with higher precision than is possible with any previous continuous fiber manufacturing process, since the techniques disclosed herein are capable of controlling the geometric tolerances of the tape more tightly than conventionally used composite fabrication processes to manufacture similar structures. Within the controlled cross section of the tape geometry, it is also easier to control the tension on every fiber with a tape made with the techniques disclosed herein in comparison with conventionally used composite fabrication processes, providing unrivalled control of both fiber orientation and density.

Figure 1B:
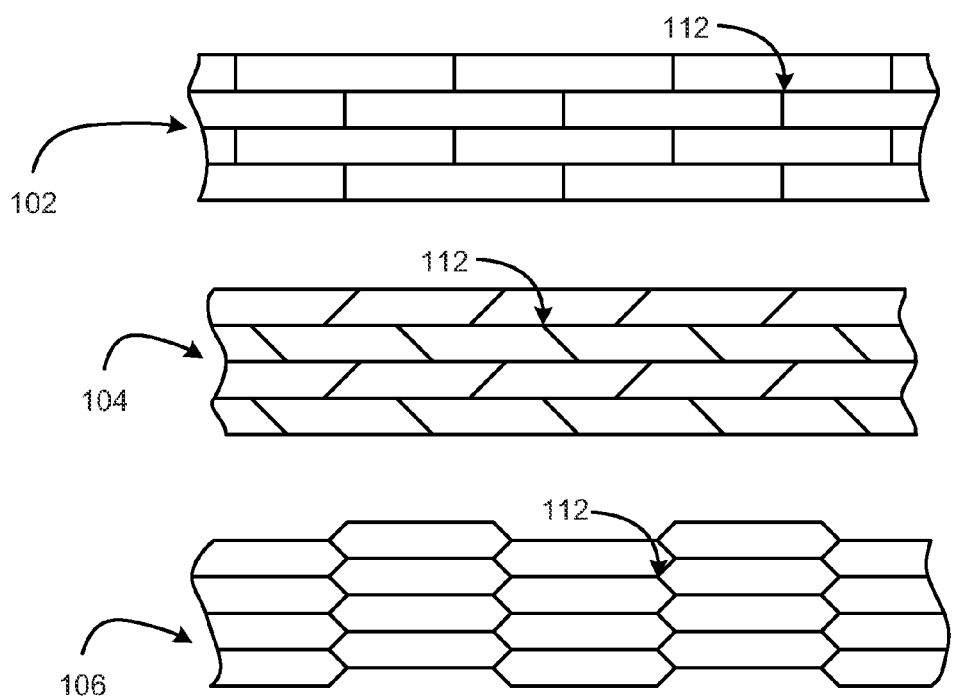
FIG. 1B is a detailed view of Circle 1B from FIG. 1A, showing three alternative tape layering designs according to some embodiments.

FIGS. 1A-1B show several nominal cross sections of a portion of a composite structure manufactured according to some embodiments. In FIG. 1A, layers 110 of a fiber built up on a structure are shown. Each layer 110 may have its own fiber orientation 108, 116 normal to its thickness. Fiber orientation 108 denotes an orientation pointing up from the page. Fiber orientation 116 denotes an orientation pointing down into the page. Each fiber orientation 108, 116 may also be tilted one direction or the other, depending on what is normal to the thickness of the layer 110. Individual tape paths may run parallel to one another to form a layer 110, packed tightly adjacent to one another.

Now referring to FIG. 1B, taken from Circle 1B in FIG. 1A, each layer 110 may have tape edges 112 that can be straight 102 (like brickwork), beveled such as alternating inward and outward beveled 104, double beveled 106, etc. Each of these shapes and orientations are for example only, and in no way limit the scope of the present invention, in these or any other embodiments. Additional care (taken by designers, software, etc.) in structural design may produce structures with greater fracture resistance than is capable with conventionally used composite fabrication processes by ensuring that nonhorizontal tape edges 112 do not line up in adjacent layers 102 (again like brickwork).

With continued reference to FIGS. 1A-1B, the double lines (like x's) between adjacent tape paths in the cross sections indicate the bonds 114 formed during assembly. These bonds 114 may include coatings and/or composition changes in the tape's surface. Inside the tape itself, inboard of any possible composition changes, in some embodiments, a core of uniform composite whose fibers are oriented parallel to the tape's long axis may be provided. Fiber density, orientation, straightness, and strain can all be controlled much more precisely during tape manufacture than conventionally used composite fabrication processes allow.

Tape Manufacturing Sub-Process

In some embodiments, the matrix that connects fibers in the tape's core may be produced under substantially uniform conditions, which achieve greatest manufacturing economy in processes known as reel-to-reel or stripline fabrication. The economics of such processes is indicative of the cost advantages of both tape fabrication and tape assembly phases disclosed herein. Higher 'throughput' in pounds-per-second can routinely drive manufacturing costs far below materials costs. Some embodiments included herein are intended to achieve new lows in manufacturing costs by driving material velocities up in both phases of manufacturing.

Sub-process phases may generally be separated according to some embodiments, without sticky 'wet' intermediary forms of material carried between them. This divisibility allows economies of scale where tape manufacturing activities may be centralized that may serve multiple composite structure applications with reels that can be assembled at multiple locations sharing reel construction plans or details. Some embodiments disclosed herein minimize the disturbance of the tape's core by subsequent assembly which allows extreme process conditions to affordably form the bulk of a composite structure, including metal or foamed matrix materials and hazardous precursors.

Figure 2:
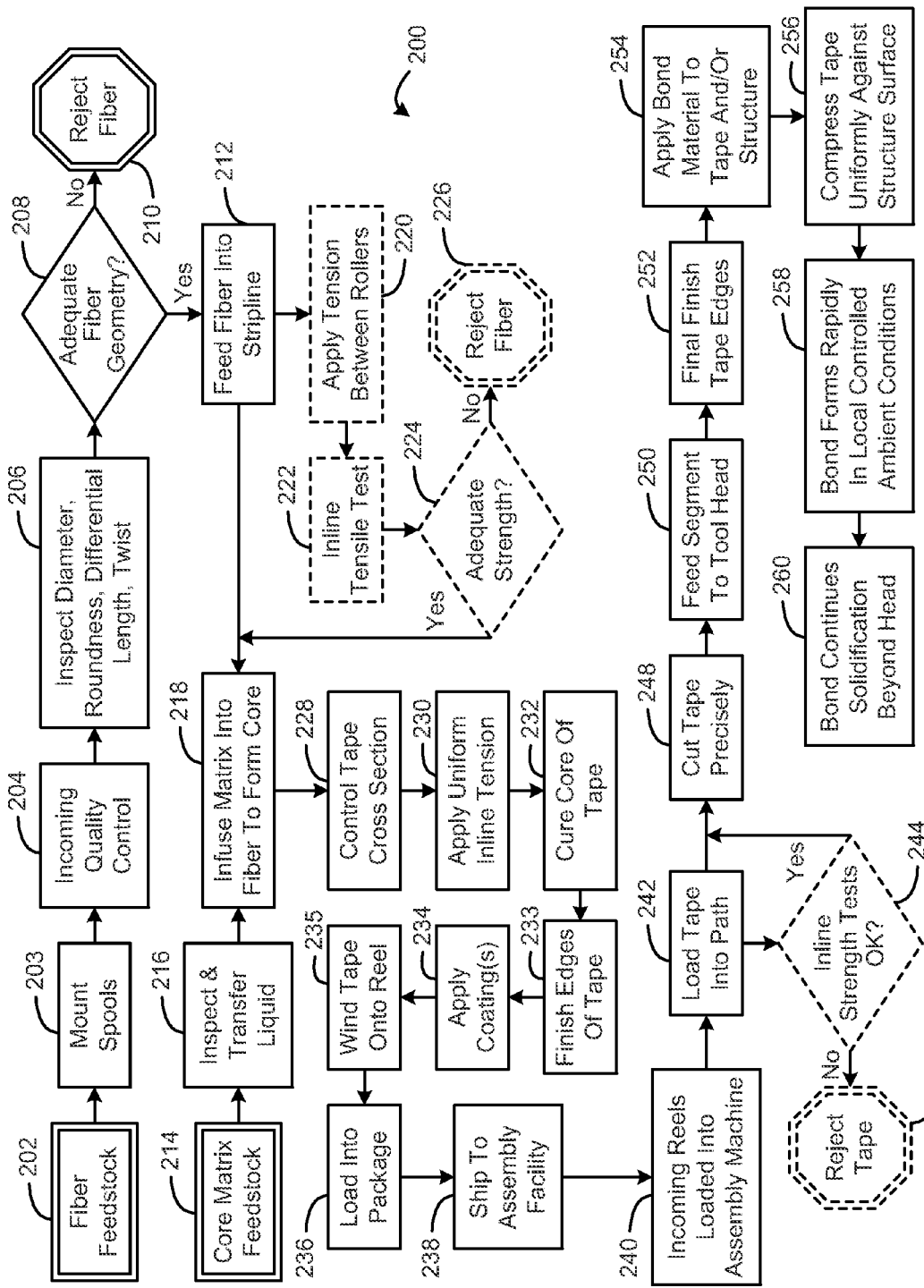
FIG. 2 shows a flowchart of processing steps according to several embodiments.

FIG. 2 shows the uncommon partitioning of manufacturing sub-processes which some embodiments share with some thermoplastic matrix precedents. Unvarying or minimally-varying process conditions form the tape once an initial material load transits the stripline and tape forming processes stabilize. In some embodiments, discarding less than about 1% of raw materials can thereby produce tape having substantial uniformity. Geometric uniformity of tape cross section may be trivially enforced by passing through dies or knife blades, but uniformity of fiber within the core may use tighter tolerances on fiber diameter, roundness, sizing uniformity, feedstock twist, and differential length (known as catenary or 'cat'), Each step shown in FIG. 2 may be carried out in the order presented, or in any other order as desired. In addition, each step is optional, and additional or fewer steps may be performed as desired. Further, steps may be repeated, replaced, substituted, modified, etc., as FIG. 2 is only an embodiment, and many other possible embodiments are possible according to the techniques and/or equipment described herein. FIG. 2 is designed to show illustrative processing steps, and in no way limits or completely defines the scope of the invention. Steps which are shown in broken line, such as step 218, are alternate processing paths which generally allow additional strength testing of the fiber or tape. These steps may be carried out, skipped, or used periodically as seen fit. Moreover, while the process shown includes steps for both tape manufacture and fabrication of a composite article, the tape manufacture process (e.g., steps 202-238) may be a separate, distinct process from the composite article fabrication (e.g., steps 240-260).

The first step 202 indicates adding fiber feedstock into a process 200. Fiber feedstock may be comprised of any type of glass (including s-glass, e-glass, volcanic glass, etc.), basalt, etc. These fibers may be provided as dry fibers on a spool, or may be entirely straight and combed out.

In step 203, the spools may be mounted to dispense the fibers, Incoming quality control 204 is a step where an inspection may reveal material defects, such as 'balls of fluff,' broken fibers, or other fibers sticking out or arranged other than with the ordered straight fibers provided in the process, in which case these unacceptable fibers may be removed prior to continuing the process 200.

Inspection process 206 is a step in which the fiber may be inspected to ensure that it has the desired cross section and statistical distribution in the fiber, and that the differential length and twist of the fiber is acceptable according to some predetermined threshold values. Accordingly, more or less deviation from a standard may be allowed depending on the severity of the control placed on the process 200.

The decision block 208 is a step in which a decision may be made as to whether the fiber is acceptable for the process 200, and if not, it may be rejected in step 210, If the fiber is acceptable, it may be fed into the stripline in step 212, which can be a web process or roll-to-roll manufacturing process, where the fiber is continuously converted into a tape.

In step 214, the matrix core may be fed into the process 200. The matrix may be added as a liquid, powder, suspension, etc. Matrix materials may include melamine, thermoplastics and thermosetting polymers such as polyvinylidene fluoride (KYNAR), polyetherketone (PEK), polyurethane, nylon, polyester such as polyethylene terephthalate ester (PETE), acrylic, polyoxybenzylmethylenglycoianhydride (BAKELITE), polycarbonate, vinyl ester, epoxy, polyimide, etc. In addition, brominated, halogenated, and Grubbs-catalyzed forms of any of the above described matrix materials and other types of matrix materials not listed may also be used. In step 216, the core matrix may be inspected to ensure it is acceptable.

In step 218, the matrix may be infused into the fiber to form the core. In this step, it may be ensured that there are no bubbles in the core when combined, and that the matrix is acceptable when infused into the fiber, possibly in the presence of pressure, compression, etc.

Steps 220, 222, 224, and 226 are additional steps. In this sub-process, an inline tensile test may be performed, possibly on a predetermined periodic schedule, continuously, random basis, etc., to ensure that the fiber has an adequate strength. If the fiber fails this tensile test, it may be rejected in step 226.

Generally, about 1 km of length or more is desired for the fibers in any given tape. Therefore, the cross section may be controlled in step 228. By controlling the cross section, the tension across the tape may be controlled to control shrinkage and fiber misalignment, such as microbuckling, that may occur during the cure. This tension may-be controlled in step 230 by applying a uniform tension across the cross section of the tape. Once it is ensured that the cross section is controlled, the core of the tape may be cured in step 232.

Curing may be achieved through any method which can substantially solidify the core of the tape, such as by catalyst, heat, ultraviolet light, compression, microwaves, etc.

Additional steps that may be performed after the tape core is cured, include finishing the edges of the tape 233 and applying coatings 234, which vary depending on the desired tape edge type, such as beveled, square, etc. In step 235, the tape may be wound onto a reel for transport, storage, etc., loaded into a package in step 236 for protection and ease of transport, and shipped to an assembly facility in step 238.

In step 240, the incoming reels may be loaded into an assembly machine for processing to create a composite structure. In step 242, the tape may be loaded into the feed path. In additional step 244, another inline strength test may be performed possibly on a predetermined periodic schedule, continuously, random basis, etc, to ensure that the fiber has an adequate strength, where if the tape does not pass; it may be rejected in additional step 246.

In the absence of a strength test 244, or if the tape passes the strength test, the tape may be precisely cist in step 248, fed to the tool head in step 250, and may have the tape edges finished for a final time in step 252. The tape edges may be smoothed, pointed, or manipulated in any fashion as desired, possibly to enhance the layering aspect of the tape once it is layered on a structure.

In step 254, bond material, such as fast-setting mortars like the matrix material; salts applied aqueously in a carrier material, such as salt water; metal formations including solders, braised metals, and intermetallics; two-part materials, such as epoxy, polyimide, etc., which may be combined just prior to application to one or both surfaces, may be applied as separate components (i.e., resin on tape surface, catalyst on structure surface) to opposing surfaces and then contacted when the surfaces are contacted to cure, etc., may be applied to the tape and/or the structure. Other bond materials may be used, as would be known to those of skill in the relevant art. Preferably, the bond material may be applied in one or two parts in layers of less than about 0.25 millimeter in thickness, but may also be applied in greater thicknesses. The tape may be uniformly compressed against the structure surface in step 256 to ensure adhesion, and the bonds may form rapidly in local controlled ambient conditions in step 258 and may continue to form even after the compression is removed and the tape exits the head in step 260. To reduce lateral movements of the tape winds, bond materials may be applied in as thin of layers as possible.

In some embodiments, after reels of dry tape are packaged to increase shelf life and to improve protection against damage during transport, the reel packages may be shipped and stored at an assembly location. Such ancillary sub-processes may add optional boxes to the fabrication sequence which may confound the process, but the boxes could enable hidden advantages. Coatings on the tape and inert gas or sealed packaging of the shipped reels may preclude aging degradation and ambient contamination in ways that may not be worthwhile on raw fiber. The precision implicit in the tape can extend to its reel and transport packaging, allowing denser storage, less mishandling, and perhaps more affordable control of ambient conditions during storage.

Tape Geometry Constraints

In some embodiments, the most significant cost savings may be inherent in the tape's extremely thin assembly bonds. Tape that may be manufactured to be straight is strained to be wound around a transport reel, that strain is released as tape is fed through an assembly machine, and a different strain is imposed as the solid tape is bent around the curvature of the path over which it is added to the structure. Both transport and assembled path strains may be considerably smaller than the strain that the most heavily loaded location in the tape will experience during the structure's use.

Although transport strains due to bending around the reel may be as high as about 1.5 times less than maximum service strain, this only helps to allow reels with roughly tenfold tighter radius of curvature on their innermost tape than the worst (tightest) curvature of the part. Keeping assembly strains below about 5% to about 10% of maximum strain may constrain tape thickness. This thickness will often be considerably smaller than the tow thickness allowed by conventionally used composite fabrication processes. For example, a typical fiber that fails at 2% strain will sacrifice 10% of its strength if a solid tape core is bent in assembly through 0.2% strain, which will occur in tape just 0.010" thick that is bent around a 5" radius.

Assembly, in some embodiments, also may involve the potential for bending strain about the other axis perpendicular to the length of the tape. To preclude strength sacrifice of a tape that is as thin as the tape disclosed herein, the width of the tape, according to some embodiments, may be about as small as the thickness of the tape (e.g., a square or rhombic cross section) to bend as easily around this second axis as possible. In some embodiments, advantageous economics probably result in widths about a fraction of an inch wide to make use of the smallest 1200 and 9600 fiber tows commonly sold today, This constraint may preclude building designs where fibers take non-geodesic paths, which have bending and shear along this second axis. However, restricting fiber paths to geodesies does not prevent building tubes and highly efficient pressure vessels with walls as thick as about 10% of their radii. In some embodiments, due to its thinness, very little strength performance is lost to tape twist.

Mass Flow Rate Economics

Figure 3:
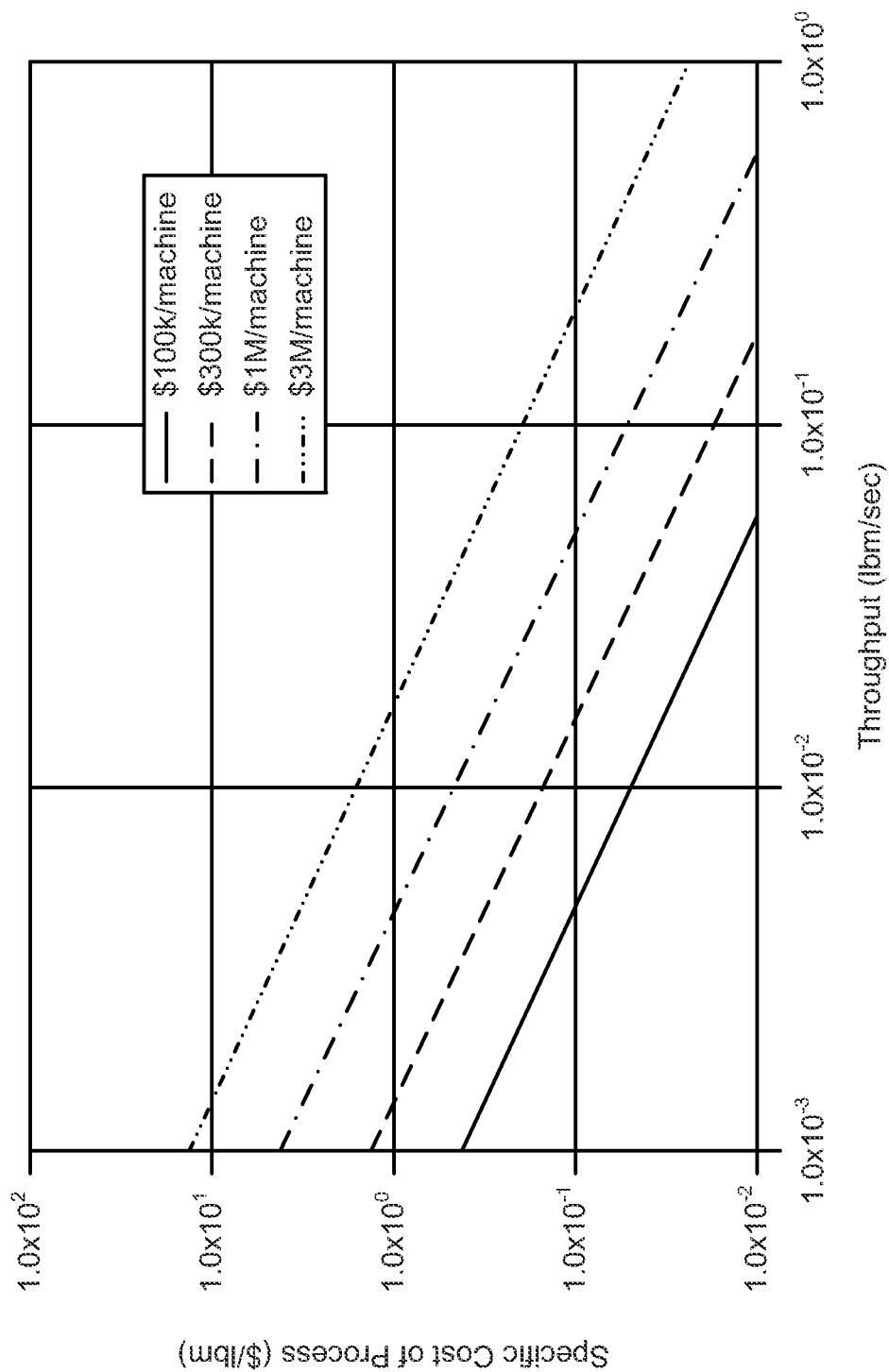
FIG. 3 is a logarithmic base-10 graph showing cost of production versus throughput.

Most conventionally used composite fabrication processes rely on assembly machines costing at least hundreds of thousands of dollars. One key to making the assembly machine manufacturing costs affordable is to make the structure in a very small fraction of that machine's "capital life." For usual production capital investments, 3 years is a typical value for that capital life, not because the machine is expected to die after working for that time, but because it must compete with other machines that can pay for themselves in 3 years. The logarithmic base 10 graph in FIG. 3 shows the consequences for producing each pound of composite structures assuming 3 year capital payback time. Lower production costs come from higher machine throughput in pounds-mass per second (lbm/sec).

Conventionally used composite fabrication processes can theoretically increase their throughput by winding bigger tows (with much higher numbers of fibers in each cross section). Some embodiments' assembly processes may begin to sacrifice strength if the tape is made thicker. However, both conventionally used composite fabrication processes and embodiments herein experience trouble if the cross section gets wider, although the forms of trouble differ with the process. In some embodiments, the tape does not lose strength performance with tape 'cupping' curvature along its width axis. The tape may, according to some embodiments, lose bond uniformity depending on the uniformity of compressive stress it can assert as cupping varies. If a conventionally used composite fabrication process tow gets much wider than about 3% of pressure vessel diameter, it begins to split with the off-geodesic shear stress pulling edges apart as the tow goes over a convex vessel end dome. Prepreg tows can wrinkle because they can not achieve different lengths in the fibers at the middle and edges of their tow width. Fiber placement machines can assemble very wide tows from multiple spools, but a large fraction of their extremely high machine cost will grow in proportion to such width gains.

Intrinsic Speed Advantage

Figure 4:
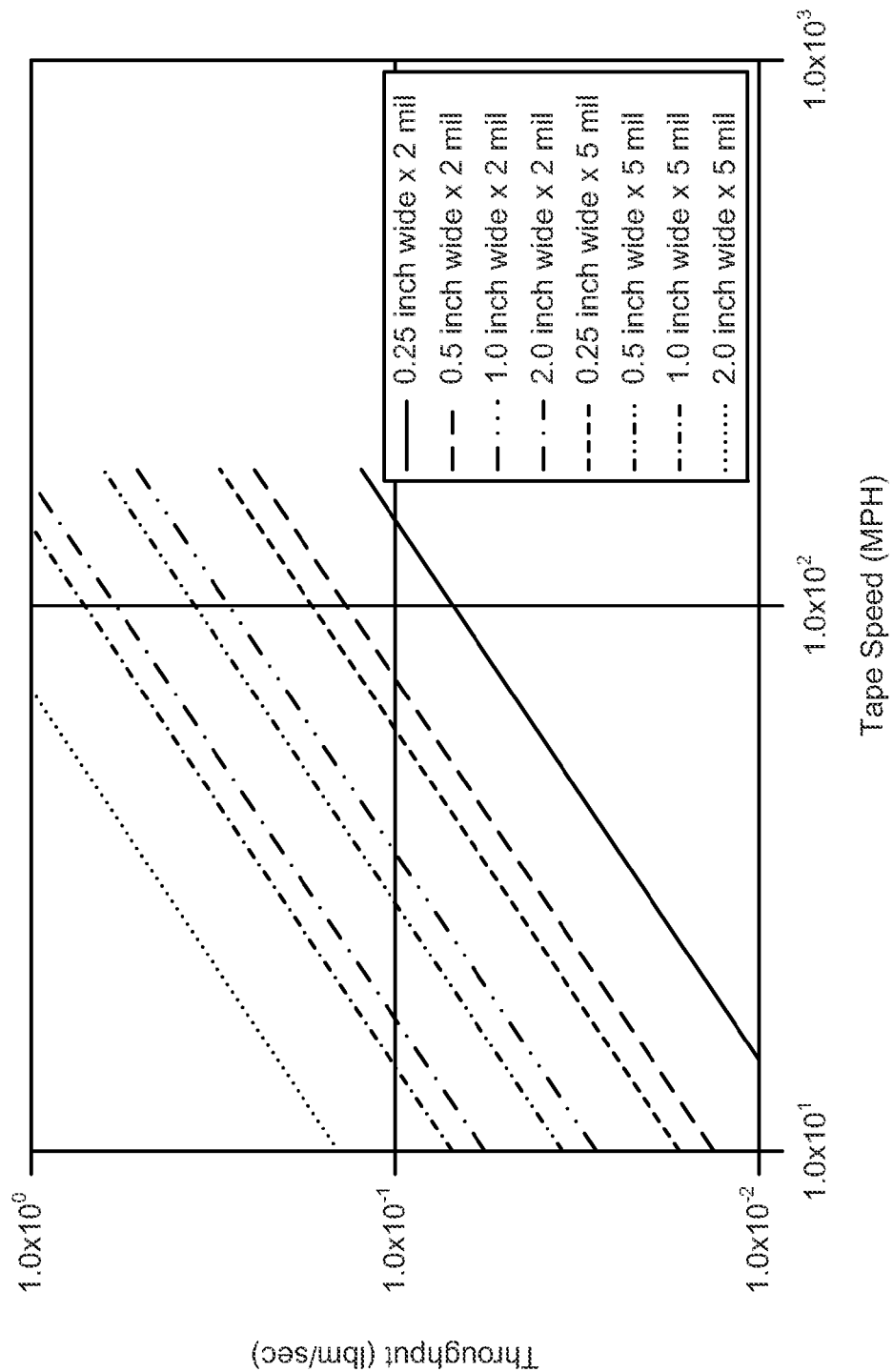
FIG. 4 is a logarithmic base-10 graph showing throughput versus tape speed.

Because some embodiments are limited in tape cross section, it might appear disadvantageous compared to conventionally used composite fabrication processes—until that cross section is multiplied by fiber addition velocity and density. The consequences of higher tape velocity as a tape of nominal 1.8 grams/cubic-centimeter is run though a sub-process are illustrated in the logarithmic base 10 graph shown in FIG. 4. Any specific cost for produced or assembled tape that is computed as a consequence of throughput (in lbm/sec on the x-axis) in FIG. 3 can be realized for a tape of given cross section run at the speed shown on the x-axis of FIG. 4 in miles per hour (MPH).

The conventionally used composite fabrication processes suffer from slow speeds (to differing extents) in four ways. Fluid dynamics means the processes usually run below critical fluid-dynamic speeds to preclude splashing and bubble capture in the finished product. The thickness of the process' liquefied matrix causes their curing times to be long (due to thermal diffusion). Chemical reaction times (of thermoset matrix plastics) usually are deliberately slow in order to prevent heat evolution (and its consequent local thermal expansion) from pulling fiber away from its intended paths. Finally, individual fibers are generally not continuous, so when a fiber reaches its end, that end may peel out of the wet tow. Some peeled ends may become pieces of fluff on which other pieces of fluff hang up, causing the entire wet assembly sub-process to run slowly enough to catch the fluff before it gets built in.

Shrinkage of the most economical matrix materials as they solidify during thermosetting has been shown to pull fiber of its intended path, risking strength loss if the fiber is segmented, or if the fiber isn't under tension during cure. Although pressure vessels can be wet wound under tension, many other curved composite structures generally cannot. Because, according to some embodiments, tape core can be solidified while the fiber is under tension, the tape itself may not be under tension and it may still remain straight during non-uniform localized thermoset reactions during assembly (wherein the tape is already very strong in bending compared to individual fibers). Other tape production options including foamed matrix (which would pull on their bubbles, not the fiber) and sparse matrix (where the fibers almost touch to form a hexagonal, close-packed, two-dimensional crystal) might enable some embodiments to avoid non-uniformity from very fast chemical reactions during tape production.

The single most important manufacturing cost cutting, inherent to some embodiments, may be the dramatic reduction of diffusion times across thin layers. Thermal diffusion time across the thin direction of the tape might limit the fastest chemical reaction that could form the matrix in the core of the tape. This time decreases as the square of tape thickness, so, for example, reactions that occur in 6 milliseconds can be uniform across the thickness of a 0.010" core (of thermal diffusivity $0.1\ cm^2/s$). Because the length of the solidification section of a tape production machine could grow to approximately 24 inches without a great increase in machine cost according to some embodiments, tape production could run at about 120 MPH. (This number is roughly 20% of the speed of sound in air, typical of the fastest reel-to-reel production capital, and could easily grow to maybe 40% of the speed of sound in fiber immersed in near vacuum,) Therefore, according to some embodiments, tape cost can be expected to drop to nearly the cost of fiber plus coating plus matrix materials once the development cost of high volume production capital can be repaid.

The tape concept achieves its greatest potential cost cutting if its assembly sub-process could ran at about 20% of the speed of sound in air. This possibility is highly plausible because mass can diffuse across a bond that might be less than about 10% of tape thickness in hundreds of microseconds if the diffusing species has a molecular weight of a few hundred Daltons. Some bond thickness is required to accommodate the lack of smoothness of tape surfaces as layers accumulate as the structure is built up. Just a 0.25" thickness of built up structures could build up a 0.001" bond thickness variation in 25 layers if each (0.010" thick layer) was as smooth as 4 microns (100 micro-inches). (Such tolerances are not routine for molded plastics, but are routine for ground metal surfaces such as one might find in dies suitable to form tape cross sections. Considerable attention to uniformity in fiber stress during tape formation may be sought to preserve cross section tolerances once the tape has left its constricting die.)

Assembly Techniques that Bond Tape to Structure

Precise bonding of tape to the surface of the structure being built up may proceed at extremely high speeds with control over the placement of each tape wind. In order to control this speed and placement, an assembly machine similar to the configuration used for Fiber Placement (FP) may be used, but augmented in some features. In some embodiments, a dry tape may be used that is more easily controlled at high speed. Slightly stiffer capstans and tension control feedback loops could accompany a tape path where radii of curvature may be about 10" or greater, but could also be lower.

In some embodiments, all tape paths may not be continuous, even though the fiber used to make the tape itself may be continuous. As in FP, it is advantageous to cut the tape perpendicular to its length, as well as at acute angles that may be off-parallel in relation to the fiber. Those acute angles allow layers of the tape to remain in a nearly smooth plane, rather than piling up as wound tows may when bunching together over a structure, such as a pressure vessel end dome, Such bunching up might otherwise force bands of fiber to cross and impose much smaller local radii of curvature that may concentrate compressive stress across the matrix perpendicular to the fiber. Even metal matrixes are an order of magnitude weaker in this direction, so structural efficiency in some embodiments mimics the designs of FP to keep layers smooth. Because some embodiments use solidified tape core which is less likely to fray when cut, a cutoff tool can probably function at angles closer to the fiber than the about 20° characteristic of current state-of-the-art FP.

Unlike FP, the portion of the assembly machine which actually attaches the cut tape segment to the structure at high speed, according to some embodiments, does not have to be wide with tension control at dozens of stations across the width of a combined tow. (Nor does the entire tow delivery path need to be patrolled for fluff accumulation.) Simpler than FP, the portion of the assembly machine may deliver a relatively constant compressive stress across the width of the tape as it cups around various large radii of curvature perpendicular to the fiber path. This may utilize several, instead of dozens of, linear motors driving small elastomer rollers to push against the dry outside of the tape.

In some embodiments, two-part adhesives may form the early forms of organic bonding interlayers. Secondary dry tapes of nanolaminate solder are likely to provide an advantageous medium term bonding alternative, according to some embodiments. Whether applied as a solid, liquid, or condensing vapor, according to some embodiments, the applied bond may be applied in the last fraction of a millisecond before the tape touches the structure's surface to achieve maximum assembly speed for a given bonding chemistry/metallurgy. Once applied to both the tape and structure surface, any excess bonding material may be scavenged so it does not solidify in the tape path or as blobs on the surface of the structure (to either side of the recent tape assembly).

FIG. 5A shows a side view of some assembly sub-process equipment near the line of contact where the tape 506 joins to the structure 504 according to some embodiments. More or less assembly sub-process equipment may be used in the process as desired, and the equipment shown here is for example only and in no way limits the scope of the present invention. Solid, liquid, and vapor alternatives for applying the bonding material may be applied to the tape 506 and structure 504 at a location of the compression control wheel 502 'downtape' from the contact point 514, and the environment control components surrounding the point, for example, a shroud 508, heater (not shown), humidifier (not shown), etc. As shown in FIG. 5A, the bond may continue solidifying well outside of the controlled environment region inside the tool head 500. The localized assembly sub-process may continue outside the tool head 500 as long as the tape 506 remains substantially adhered so as not to delaminate before the tool head 500 returns to the vicinity, and the bonding sub-process may no longer be sensitive to the less controlled ambient conditions outside the tool head 500. Many plastics and metals have reactions whose reaction rates are sensitive to humidity, and therefore, according to some embodiments, the tool head 500 gas shroud 508 may be big enough to keep the bonding process fully uniform within its boundaries. According to some embodiments, another function of the process may be to balance the net heat input to the structure 504 by bonding, so there is no leftover cause for thermal distortion to locally warp thin parts once the bonding is finished.

With continued reference to FIG. 5A, about zero net heat addition may be achieved using this sub-processing, since the change in temperature ($\Delta T$) and pressure ($\Delta P_{gage}$) inside the shroud 508 is probably greater than zero, and the heat added to the system ($Q_{heat}$) is probably less than zero.

In FIG. 5B, a front view of a portion of the tool head 500 is shown according to some embodiments. Individually adjustable compliant wheels 502 may each have their own controlled compression 512 such that each compliant wheel is able to follow the contours of the tape 506 and structure 504 surface interface so that uniform compression may be achieved. Note that at least 6 Degrees of Freedom (DoF) control of structure location and orientation plus 2 DoF control of tool head location and orientation are possible in some embodiments, This compares to only 2 DoF control of structure location and orientation plus 2 DoF control of tool head location and orientation for pressure vessel and 2 DoF control of structure location and orientation plus 1 DoF control of tool head location and orientation for tubing.

Advantages

In several embodiments, the following potential advantages may be obtained compared to conventional composite manufacturing processes:

1. Lower Manufacturing Cost
2. Lower Material Costs (via reduced matrix fraction from foam or sparse matrix)
3. Potential for Nearly Zero Tooling Costs (via assembly of strained second layer)
4. Improved Tensile Strength with the Same Fiber (via reduced matrix traction)
5. Wider Choice of Matrix Materials
6. Higher Precision (intrinsic to thickness constraint and bond surface tolerances)
7. Thin Sections (intrinsic to thickness constraint, 2 layers may form a structure)
8. Potential for Higher Specific Strength Through Matrix Density Reduction (the matrix in the core of the tape can be infused as a foam or spray to provide a lower density at reduced matrix strength)
9. Compatibility with Designs for Conventional Wet-Wound, 'Pre-Preg', and Fiber Placement Manufacturing Processes With reference to FIG. 5A, a method for forming a composite structure may comprise forming a first ply, and forming a second ply above the first ply according to some embodiments. Forming the first and second ply may comprise applying a bonding material to a tape which may be comprised of a fiber and a matrix, wherein the bonding material may have a curing time of less than about 1 second, and adding the tape to a substrate for forming adjacent tape winds which may have about a constant distance therebetween.

In some embodiments, tape wind may be a discrete piece of tape, a portion of a continuous length of tape that forms multiple winds, etc. The substrate under the first ply may be any object or thing, including an object, a previously formed ply, etc. The substrate under the second ply may be the first ply, an intermediary layer, etc. Note that additional plies may be formed before or after these steps are performed.

In some embodiments, an article of manufacture may comprise a plurality of plies in a stacked configuration, wherein each ply may comprise a plurality of tape winds having edges and a distance between the edges of adjacent tape winds in the same ply may be about constant along a length of the wind. Note that the distance may be zero or some other value. In addition, each tape wind may comprise elongated fibers and a matrix, axes of the fibers being oriented about parallel to a longitudinal axis of the tape wind.

In some alternative approaches, the tape may be applied to the substrate at a rate of greater than about 0.894 meter/sec (about 2 MPH), greater than about 10 meters/sec (about 23 MPH), or greater than about 25 meters/sec (about 56 MPH).

In particularly preferred embodiments, the composite structure may be formed without performing a curing step after the tape is applied to the substrate. This may result in significant cost savings in the manufacturing costs of producing the composite structure.

In some embodiments, the bonding material may have a curing time of less than about 100 milliseconds, allowing the tape to cure to the structure with very little chance of movement or misalignment after initial placement of the tape.

In some approaches, upper surfaces of the tape winds in each ply may lie along a substantially straight line oriented perpendicular to longitudinal axes of the tape in each wind and parallel to tape surfaces thereof.

In some approaches, edges of the tape winds in the first ply may be offset from edges of the tape winds in the second ply. Further, edges of the tape wind on any given ply may be offset from edges of the tape winds in an adjacent ply.

In some embodiments, the edges of the tape winds may be squared, wherein the tape wands form a brickwork pattern (102, FIG. 1B), in other embodiments, the edges of the tape winds may be beveled (104, FIG. 1B), or may be double beveled (106, FIG. 1B).

In some particularly preferred approaches, the tape winds in at least one of the plies may be a continuous piece of tape. These approaches are particularly useful for objects in which the tape may be wrapped around and around the substrate, e.g., those objects having a circular or ovular cross section. Note, however, that such objects can also be formed from discrete pieces of tape.

In some embodiments, the tape winds in at least one of the plies may be discrete pieces of tape. These embodiments are particularly useful for objects such as panels and other objects having definable edges. Note, however, that such objects may also be wrapped with continuous tape.

In some embodiments, adjacent tape winds in each ply may be offset from each other in a direction substantially perpendicular to the tape surfaces. This may form a crossing pattern between the lower tape winds and the upper tape winds. In further embodiments, the tape winds may be double beveled.

In certain embodiments, longitudinal axes of the tape winds in the first ply may be oriented at an angle of between 0 and about 180° from longitudinal axes of the tape winds in the second ply. This allows each ply to be applied at differing angles, possibly selected at random, according to a preset angle, etc., in the winding process to enhance structural strength of the structure.

In some embodiments, forming the tape may include infusing the matrix into the fiber and curing the matrix.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An article of manufacture, comprising:
    a plurality of plies in a stacked configuration; and
    a bonding layer between at least two of the plies, the bonding layer having a thickness in a range from greater than zero and less than about 0.25 mm,
    wherein each ply comprises a plurality of winds of a tape, the tape winds having edges,
    wherein a distance between the edges of adjacent tape winds in the same ply is about constant along a length of the wind,
    wherein each tape wind comprises elongated fibers and a matrix, longitudinal axes of the fibers being oriented about parallel to a longitudinal axis of the tape wind,
    wherein each tape wind has a thickness, t, and a width w, wherein t is about equal to w.

2. The article of manufacture of claim 1, wherein upper surfaces of the tape winds in each ply lie along a substantially straight line oriented perpendicular to longitudinal axes of the tape in each wind and parallel to upper surfaces thereof, wherein the elongated fibers in each tape wind are continuous fibers.

3. The article of manufacture of claim 1, wherein the edges of the tape winds on a given ply are offset from the edges of the tape winds in an adjacent ply.

4. The article of manufacture of claim 3, wherein the edges of the tape winds are squared, wherein the tape winds form a brickwork pattern.

5. The article of manufacture of claim 3, wherein the edges of the tape winds are beveled.

6. The article of manufacture of claim 1, wherein the plurality of tape winds in at least one of the plies are present as a single, continuous piece of tape.

7. The article of manufacture of claim 1, wherein at least one tape wind in at least one of the plies is a discrete piece of tape.

8. The article of manufacture of claim 1, wherein the longitudinal axis of at least one tape wind is orientated at an angle of between 0° and about 180° relative to at least one other tape wind.

9. The article of manufacture of claim 1, wherein the matrix is selected from a group consisting of: a polyvinylidene fluoride, a polyetherketone, a polyurethane, a polyester, an acrylic, a polyoxybenzylmethylenglycolanhydride, a polycarbonate, a vinyl ester, and combinations thereof.

10. An article of manufacture, comprising:
    at least two plies in a stacked configuration,
    wherein each ply comprises a plurality of winds of a tape, the tape winds having edges,
    wherein a distance between the edges of adjacent tape winds in the same ply is about constant along a length of the wind,
    wherein each tape wind comprises elongated fibers and a matrix, longitudinal axes of the fibers being oriented normal to a thickness of the tape wind,
    wherein the plurality of tape winds in at least one of the plies are present as a single, continuous piece of tape,
    wherein each tape wind has a thickness, t, and a width w, wherein t is about equal to w.

11. The article of manufacture of claim 10, wherein the matrix comprises a brominated matrix material.

12. The article of manufacture of claim 10, further comprising a bonding layer between the at least two plies, wherein the bonding layer includes a bonding material having a curing time of less than about 1 second.

13. The article of manufacture of claim 10, wherein the article of manufacture has a rounded shape.

14. The article of manufacture of claim 10, wherein upper surfaces of the tape winds in each ply lie along a substantially straight line oriented perpendicular to longitudinal axes of the tape in each wind and parallel to upper surfaces thereof, and wherein the edges of the tape winds on a given ply are offset from the edges of the tape winds in an adjacent ply.

15. An article of manufacture, comprising:
   at least two plies in a stacked configuration; and
   a bonding layer between the plies, the bonding layer having a thickness in a range from greater than zero to less than about 0.25 mm,
   wherein each ply comprises a plurality of winds of a tape, the tape winds having edges,
   wherein a distance between the edges of adjacent tape winds in the same ply is about constant along a length of the wind,
   wherein each tape wind comprises elongated fibers and a matrix, longitudinal axes of the fibers being oriented about parallel to a longitudinal axis of the tape wind,
   wherein the matrix is selected from a group consisting of: a polyvinylidene fluoride, a polyetherketone, a polyurethane, a polyetherketone, an acrylic, a polyoxybenzylmethylenglycolanhydride, a polycarbonate, a vinyl ester, and combinations thereof,
   wherein the plurality of tape winds in at least one of the plies are present as a single, continuous piece of tape,
   wherein each tape wind has a thickness, t, and a width w, wherein t is about equal to w.

16. The article of manufacture of claim 1, wherein the matrix is selected from a group consisting of: a polyvinylidene fluoride, a polyetherketone, polyethylene terephthalate, a polyoxybenzylmethylenglycolanhydride, and combinations thereof.

17. The article of manufacture of claim 1, wherein the matrix material includes at least one of: a polyvinylidene fluoride in Grubbs-catalyzed form, a polyetherketone in Grubbs-catalyzed form, a polyethylene terephthalate in Grubbs-catalyzed form, an acrylic in Grubbs-catalyzed form, and a vinyl ester in Grubbs-catalyzed form.

18. The article of manufacture of claim 1, wherein the matrix material includes melamine.

* * * * *